United States Patent [19]
Kaschke

[11] Patent Number: 5,999,821
[45] Date of Patent: Dec. 7, 1999

[54] RADIOTELEPHONE HAVING A USER INTERFACE MODULE

[75] Inventor: Kevin D. Kaschke, Hoffman Estates, Ill.

[73] Assignee: Motorola, Inc., Schaumburg, Ill.

[21] Appl. No.: 08/790,643

[22] Filed: Jan. 29, 1997

[51] Int. Cl.⁶ .................................................. H04B 1/38
[52] U.S. Cl. ........................ 455/550; 379/429; 455/575
[58] Field of Search ........................... 455/550, 90, 575; 379/429, 428, 433, 442; 200/5 A, 11 R, 35 B; 361/814, 748, 728

[56] References Cited

U.S. PATENT DOCUMENTS

| | | | |
|---|---|---|---|
| 4,916,262 | 4/1990 | Jungels-Butler et al. | 200/5 A |
| 5,235,636 | 8/1993 | Takagi et al. | 379/429 |
| 5,357,570 | 10/1994 | Tomura et al. | 379/429 |
| 5,689,823 | 11/1997 | Phillips | 455/90 |

*Primary Examiner*—Dwayne D. Bost
*Assistant Examiner*—Tracy M. Legree
*Attorney, Agent, or Firm*—Kevin D. Kaschke

[57] ABSTRACT

A radiotelephone (100) comprises a user interface module (102) including a membrane sheet layer (302), user interface circuitry (304) and a flexible circuit sheet layer (306), and a radio circuitry module (104) including radio circuitry (308) and a radio housing (310). The user interface circuitry (304) includes an earpiece electroacoustic transducer (322), microphone electroacoustic transducer (324), a keypad (326) and an electronic display (328) being disposed between the membrane sheet layer (302) and the flexible circuit sheet layer (306). The radio circuitry (308) is electrically coupled to the user interface circuitry (304) via electrical conductors (330–344) on the flexible circuit sheet layer (306) permitting many marketing options for the user interface module (102) and efficient manufacturing of the radiotelephone (100). The radio housing (310) encloses the radio circuitry (308) and is mechanically coupled to the user interface module (102). The user interface module (102) integrates the earpiece electroacoustic transducer (322) and the microphone electroacoustic transducer (324) as electroacoustic transducer sheet layers (402 and 414) in the user interface module (102), and includes hinge mechanisms (702, 902, 904) to produce a credit card sized radiotelephone (FIGS. 7–10).

30 Claims, 8 Drawing Sheets

RADIOTELEPHONE HAVING A USER INTERFACE MODULE

BACKGROUND OF THE INVENTION

1. Field of the Invention

The present invention relates generally to radiotelephones, and more particularly to a radiotelephone having a user interface module.

2. Description of the Related Art

Advances in computing, wireless transceivers, displays, input devices, batteries, materials and mechanics have promoted the miniaturization and weight reduction of portable communication devices, such as cellular and cordless radiotelephones. A user interface portion of a portable radiotelephone typically includes a display, a keypad, an earpiece transducer and a microphone transducer. Conventional radiotelephones construct the user interface portion using one or more molded plastic housings to provide a structure for mounting and retaining a display lens, the keypad, the earpiece transducer and the microphone transducer. Wires from the earpiece transducer and the microphone transducer are routed through the housing for attachment to a printed circuit board. However, as portable communication devices become smaller and lighter, the structure of a conventional portable radiotelephone user interface portion of a radiotelephone inhibits size and weight reductions of the portable radiotelephone. Moreover, physical changes to the user interface portion of the portable radiotelephones to promote differentiation in the consumer market have a relatively limited number of arrangements and are time consuming to implement in production.

Accordingly, there is a need for an improved structure for the user interface portion of a portable communication device yielding size and weight reductions. Additionally, the improved structure should improve manufacturability, reduce cost and offer a variety of market differentiation options with minimum design cycle time.

DETAILED DESCRIPTION OF THE PREFERRED EMBODIMENTS

Figure 1:
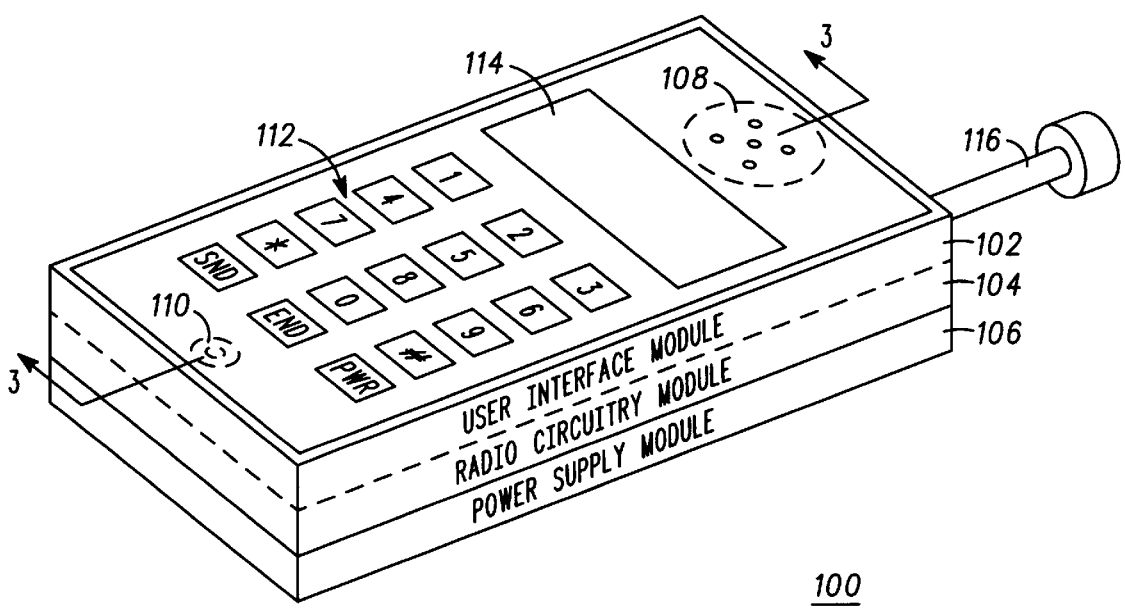
FIG. 1 is a perspective view of a first embodiment of a radiotelephone employing the present invention.
Figure 2:
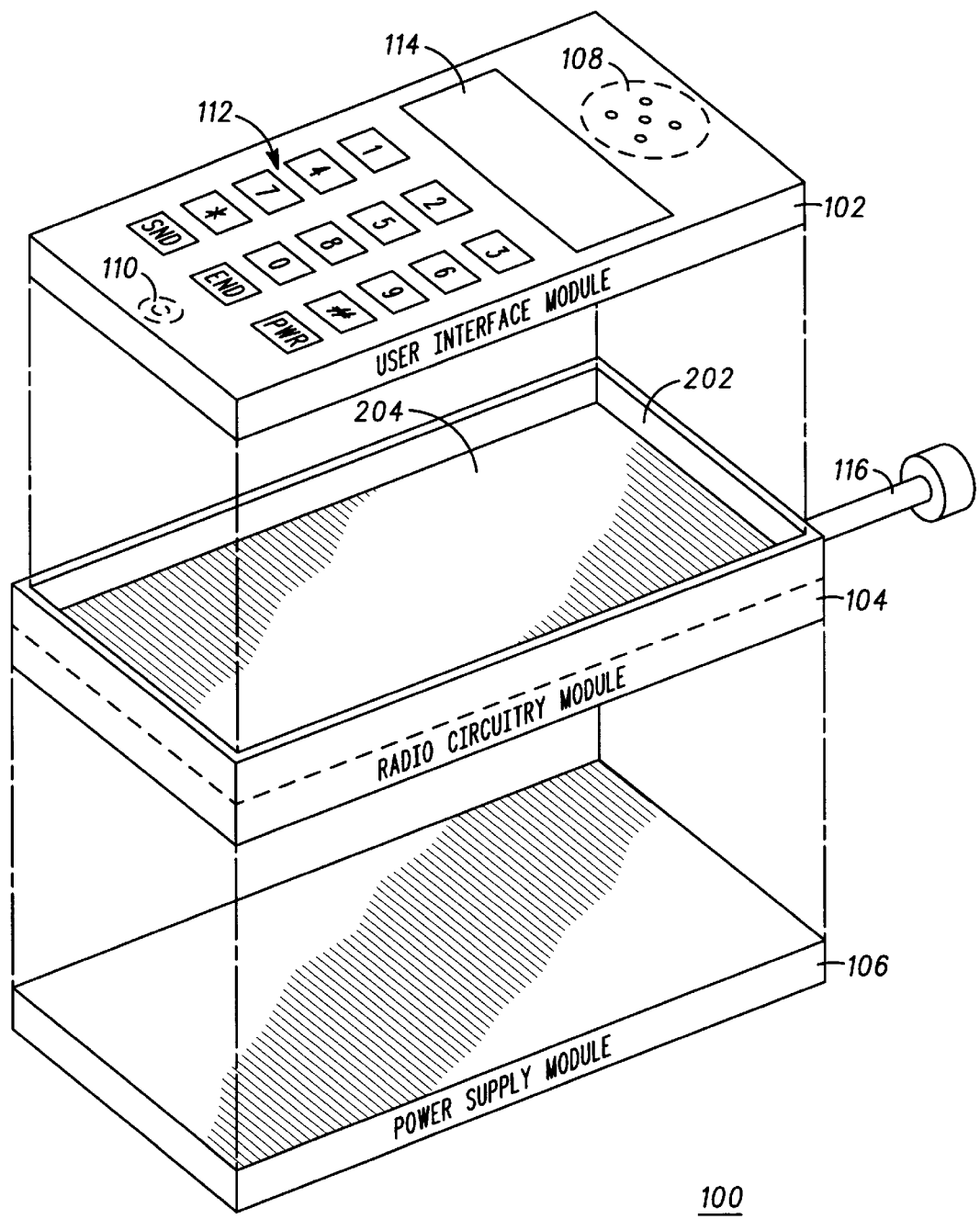
FIG. 2 is an exploded perspective view of the radiotelephone of FIG. 1.

FIG. 1 is a perspective view of a first embodiment of a radiotelephone 100 employing the present invention. FIG. 2 is an exploded perspective view of the radiotelephone of FIG. 1. The radiotelephone 100 generally comprises a user interface module 102, a radio circuitry module 104 and a power supply module 106. The user interface module 102 generally comprises an earpiece electroacoustic transducer 108, a microphone electroacoustic transducer 110, a data input circuit 112, an electronic display 114 and an antenna 116.

The radiotelephone 100 preferably operates in the cellular radio frequency band. However, any radio frequency band including cordless frequency bands may be used. The radiotelephone 100 is preferably a portable unit which is hand carried by a user. However, the present invention may also be applied to mobile handset unit which are installed in a user's vehicle and typically connected to a radio transceiver by a coilcord. Portable units typically need to be smaller and lighter than mobile handset units because of their required portability and storage requirements.

The radio circuitry module 104 preferably has a recess 202 disposed in a top side and adapted to receive the user interface module 102. The user interface module 102 has a predetermined thickness which is substantially the same as the depth of the recess 202. The recess 202 advantageously permits the user interface module 102 to have a flush appearance with the radio circuitry module 104 and to cover the edges of the user interface module 102. However, the recess 202 would not be necessary if the edges of the user interface module 102 had a finished appearance, such as that provided with a decorative edging or trim ring. Such an edging would also provided additional structural support for the user interface module 102.

The radio circuitry module 104 also preferably has a mounting surface 204 disposed on the top side of the radio circuitry module 104. In FIG. 2 the mounting surface 204 is adapted to support a bottom side of the user interface module 102. The support is needed to provide the user interface module 102 with rigidity when assembled with the radio circuitry module 104. Preferably, the mounting surface 204 is a plastic wall integrally molded with a radio housing of the radio circuitry module 104. Alternatively, the mounting surface 204 may be a printed circuit board disposed within the radio housing of the radio circuitry module 104. Thus, when a user of the radiotelephone 100 actuates a key on a keypad, the user interface module 102 has the required stiffness to operate properly. However, the mounting surface 204 would not be necessary if appropriate stiffeners can be incorporated inside the user interface module 102. If this is possible, the user interface module 102 can rest on ledges at the perimeter of and/or periodically interspersed throughout the inside the radio housing of the radio circuitry module 104. In this case, the user interface module 102 would be clear and above any radio circuitry inside the radio housing.

The power supply module 106 is adapted to be mechanically coupled to the radio circuitry module 104 to secure the power supply module 106 to the radio circuitry module 104. The power supply module 106 is adapted to be electrically coupled to the radio circuitry module 104 to provide power to the radio circuitry module 104. In FIGS. 1 and 2, the power supply module 106 is shown as a relatively thin structure which extends across the entire back side of the radiotelephone. Alternatively, the power supply module 106 may be incorporated inside the radio circuitry module 104, if so desired.

Figure 3:
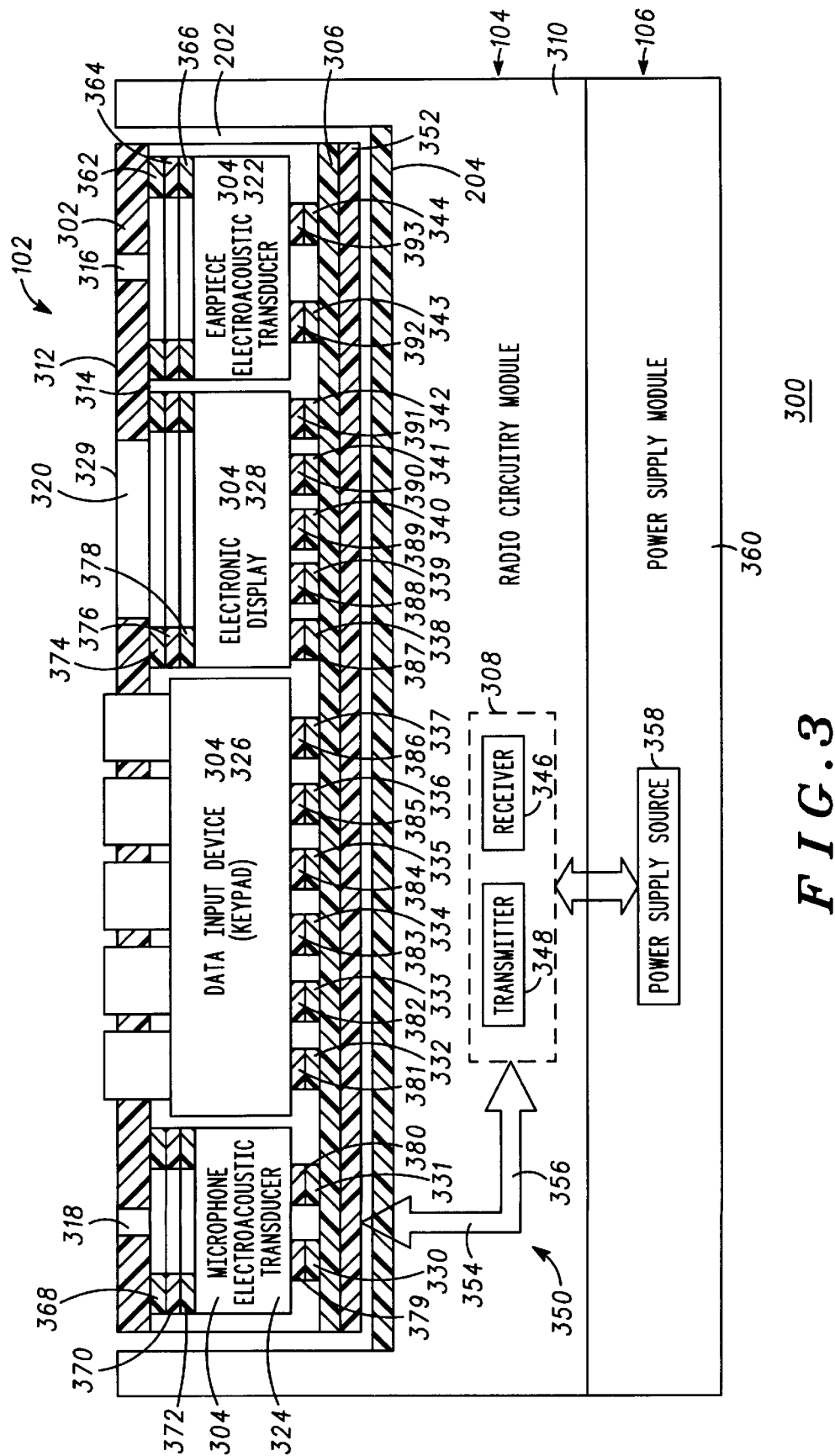
FIG. 3 is an enlarged cross sectional view of the radiotelephone of FIG. 1 taken along lines 3—3 in accordance with a first embodiment of the present invention.

FIG. 3 is an enlarged cross sectional view 300 of the radiotelephone 100 of FIG. 1 taken along lines 3—3 in accordance with a first embodiment of the present invention.

The user interface module 102 generally includes a membrane sheet layer 302, user interface circuitry 304 and a flexible circuit sheet layer 306. The radio circuitry module 104 generally includes radio circuitry 308 and a radio housing 310. Note that the user interface circuitry is generally designated by reference number 304 to represent not only those particular user interface circuits shown but all others that are well known in the art.

The membrane sheet layer 302 has a top surface 312 disposed opposite a bottom surface 314. The membrane sheet layer 302 has earpiece acoustic aperture 316, a microphone acoustic aperture 318, and a display aperture 320. Each aperture extends through the membrane sheet layer 302 between the top surface 312 and the bottom surface 314.

The user interface circuitry 304 includes an earpiece electroacoustic transducer 322, a microphone electroacoustic transducer 324, a data input circuit 326 and an electronic display 328. The top surface 312 is accessible to a user of the radiotelephone 100 so that the user can actuate the data input circuit 326, look at the electronic display 328, listen via the earpiece electroacoustic transducer 322 and speak into the microphone electroacoustic transducer 324.

The earpiece electroacoustic transducer 322 is mechanically coupled to the membrane sheet layer 302 and disposed on the bottom surface 314 of the membrane sheet layer 302 opposite the earpiece acoustic aperture 316. The preferred mechanical coupling comprises a first adhesive layer 362, gasket layer 364 and a second adhesive layer 366 arranged in a sandwich configuration to provide an appropriate acoustic cavity and acoustic seal for the earpiece electroacoustic transducer 322. This location of the earpiece electroacoustic transducer 322 permits a user to hold the radiotelephone 100 up to their head to listen to acoustic energy which is produced by the earpiece electroacoustic transducer 322 and exits the user interface module 102 through the earpiece acoustic aperture 316. The earpiece electroacoustic transducer 322 has a pair of electrical contacts 392–393 for electrically coupling to the flexible circuit sheet layer 306.

The microphone electroacoustic transducer 324 is mechanically coupled to the membrane sheet layer 302 and disposed on the bottom surface 314 of the membrane sheet layer 302 opposite the microphone acoustic aperture 318. The preferred mechanical coupling comprises a first adhesive layer 368, gasket layer 370 and a second adhesive layer 372 arranged in a sandwich configuration to provide an appropriate acoustic cavity and acoustic seal for the microphone electroacoustic transducer 324. This location of the microphone electroacoustic transducer 324 permits a user to hold the radiotelephone 100 up to their head to speak acoustic energy which is produced by the microphone electroacoustic transducer 324 and enters the user interface module 102 through the microphone acoustic aperture 318. The microphone electroacoustic transducer 324 has a pair of electrical contacts 379–380 for electrically coupling to the flexible circuit sheet layer 306.

The data input circuit 326 is mechanically coupled to the membrane sheet layer 302 and disposed on the bottom surface 314 of the membrane sheet layer 302. The data input circuit 326 is preferably a conventional keypad that has individual keys which a user manually actuates to enter information, such as a phone number. Alternatively, the keypad can be a touch screen device that has key images appearing on an underlying display. The data input circuit 326 can be a membrane type keypad assembly such as disclosed, for example, in U.S. Pat. No. 4,916,262 or a silicone rubber type keypad assembly such as disclosed, for example, in U.S. Pat. No. 4,636,593. The data input circuit 326 has a set of electrical contacts 381–386 for electrically coupling to the flexible circuit sheet layer 306.

The electronic display 328 is mechanically coupled to the membrane sheet layer 302 and disposed on the bottom surface 314 of the membrane sheet layer 302 opposite the display aperture 320. The preferred mechanical coupling comprises a first adhesive layer 374, gasket layer 376 and a second adhesive layer 378 arranged in a sandwich configuration to provide an appropriate dust seal for the electronic display 328. This location of the electronic display 328 permits a user to view displayed information through the display aperture 320 which is produced by the electronic display 328. Preferably, a transparent lens 329 covers the display aperture 320 to keep dust and debris from distorting any information displayed on the electronic display 328. The electronic display 328 can be any type of electronic display including but not limited to a liquid crystal display, a light emitting diode display, a vacuum fluorescent display, and a plasma display. The electronic display 328 has a set of electrical contacts 387–391 for electrically coupling to the flexible circuit sheet layer 306.

The flexible circuit sheet layer 306 has a plurality of electrical conductors 330–344 electrically coupled to the user interface circuitry 102 and disposed on the bottom surface 314 of the membrane sheet layer 302. The plurality of electrical conductors further includes a pair of electrical earpiece conductors 343—344 electrically coupled to the pair of electrical contacts 392–393 on the earpiece electroacoustic transducer 322, a pair of electrical microphone conductors 330–331 electrically coupled to the pair of electrical contacts 379–380 on the microphone electroacoustic transducer 324, a set of electrical data input conductors 332–337 electrically coupled to the set of electrical contacts 381–386 on the data input circuit 326, and a set of electrical display conductors 338–342 electrically coupled to the set of electrical contacts 387–391 on the electronic display 328. Note that the a set of electrical data input conductors 332–337 and the set of electrical display conductors 338–342 are shown by general representation only. The required number of conductors will depend on the size and kind of data input device and electronic display as is well known in the art.

The radio circuitry 308 is electrically coupled to the user interface circuitry 304 via the electrical conductors 330–344 of the flexible circuit sheet layer 306. The radio circuitry 308 further includes a receiver 346 and a transmitter 348. Note that the radio circuitry 308 is generally designated by reference number 308 to represent not only those particular radio circuits shown but all others that are well known in the art. The receiver 346 is electrically coupled to the earpiece electroacoustic transducer 322 via the pair of electrical earpiece conductors 343—344 and electrically coupled to the electronic display 328 via the set of electrical display conductors 338–342. The transmitter 348 is electrically coupled to the microphone electroacoustic transducer 324 via the pair of electrical microphone conductors 330–331, electrically coupled to the data input circuit 326 via the set of electrical data input conductors 332–337, and electrically coupled to the electronic display 328 via the set of electrical display conductors 338–342. A variety of methods may be used secure the plurality of conductors on the flexible circuit sheet layer 306 to the user interface circuitry 304 including conductive epoxy as is well known in the art.

Note that the electrical connections between the radio circuitry 308 and individual circuits 322, 324, 326 and 328 of the user interface circuitry 304 is generally designated by electrical connection 350 for the sake of simplicity of illustration. Also note that portions of the flexible circuit sheet layer 306 may be partially cut out and bent at an angle relative to the flat plane of the rest of the flexible circuit sheet layer 306 to reach user interface circuits at various levels. (see FIG. 4) Further, note that other spacers may be used in front of or behind the user interface circuits to provide a compact user interface module 102. (see FIG. 4)

The user interface module 102 further includes a first connector 354 electrically coupled to the plurality of electrical conductors 330–344 on the flexible circuit sheet layer 306. The radio circuitry module 104 further includes a second connector 356 adapted to be mechanically connected to the first connector 354 to electrically couple the radio circuitry 308 to the user interface circuitry 304. The first connector 354 and the second connector 356 preferably comprise conventional male and female connectors, respectively. Alternatively, the first connector 354 and the second connector 356 may comprise elastomeric conductive "zebra" strips or any other suitable connector as is well known in the art.

The radio housing 310 includes the radio circuitry 308 and is adapted to be mechanically coupled to the user interface module 102. Preferably, the user interface module 102 has an adhesive layer 352 bonded to a bottom surface of the flexible circuit sheet layer 306 to secure the bottom surface of the flexible circuit sheet layer 306 to the mounting surface 204 on the radio housing 310. However, any type of mechanical structure may be used to secure the user interface module 102 to the radio housing 310.

A power supply source 358 is electrically coupled to the radio circuitry 308. A power supply housing 360 includes the power supply source 358 and is adapted to be mechanically coupled to the radio housing 310.

Note that in FIG. 3 the individual circuits 322, 324, 326 and 328 of the user interface circuitry 304 are discrete, "off the shelf" parts. The conventional parts are advantageously incorporated within a user interface module 102 having a membrane structure for several reasons. First, a user interface module 102 which simply plugs into a radio circuitry module 104 is easy for a manufacturing line operator to assemble. The user interface module 102 would typically be manufactured by a subcontractor and shipped to a main radiotelephone factory for assembly into a radiotelephone. Second, the user interface module 102 is typically the portion of a radiotelephone which provides the radiotelephone with character and distinction, since it the side of the radiotelephone which a user interacts with. Therefore, the user interface module 102 is a source of distinction or variation for a radiotelephone in the consumer market. Assuming the connectors 354 and 356 are electrically and mechanically compatible, the radiotelephone manufacturer would be able to use the same radio circuitry module with multiple, different user interface modules. The user interface modules can differ in their appearance and functionality. For example, the appearance can differ by changing the color, contour, texture of the membrane sheet layer 302. Further, the earpiece acoustic aperture 316 can be varied with different patterns. Further, the style, look and feel of the data input device 326 can be varied. Functionality can be varied by changing the type of electronic display 328 or data input device 326. Thus, a radiotelephone manufacturer has a large degree of marketing flexibility of design for the radiotelephones without sacrificing efficient manufacturability of the radiotelephones.

It is also important to point out that the user interface module 102 does not necessarily need to incorporate each individual circuit 322, 324, 326 and 328 as shown. For example, the electronic display 328 may be most conveniently incorporated with the radio circuitry module 104 instead of the user interface module 102. Therefore, the user interface module 102 would most likely only have a lens 329 and a space for the electronic display 328 to be positioned close to the lens. As another example, the keypad 326 may conveniently incorporate a silicone rubber keypad with a conductive contact on the bottom of each key. In this case a printed circuit board having conductive key contacts, to be shorted by the conductive contacts on the individual keys, would most likely be incorporated within the radio circuitry module 104. The silicone rubber keypad would most likely protrude through a plurality of corresponding key apertures in the membrane sheet layer 302 as shown in FIG. 3. Thus, the designer is allowed some flexibility in the design of the radiotelephone.

Figure 4:
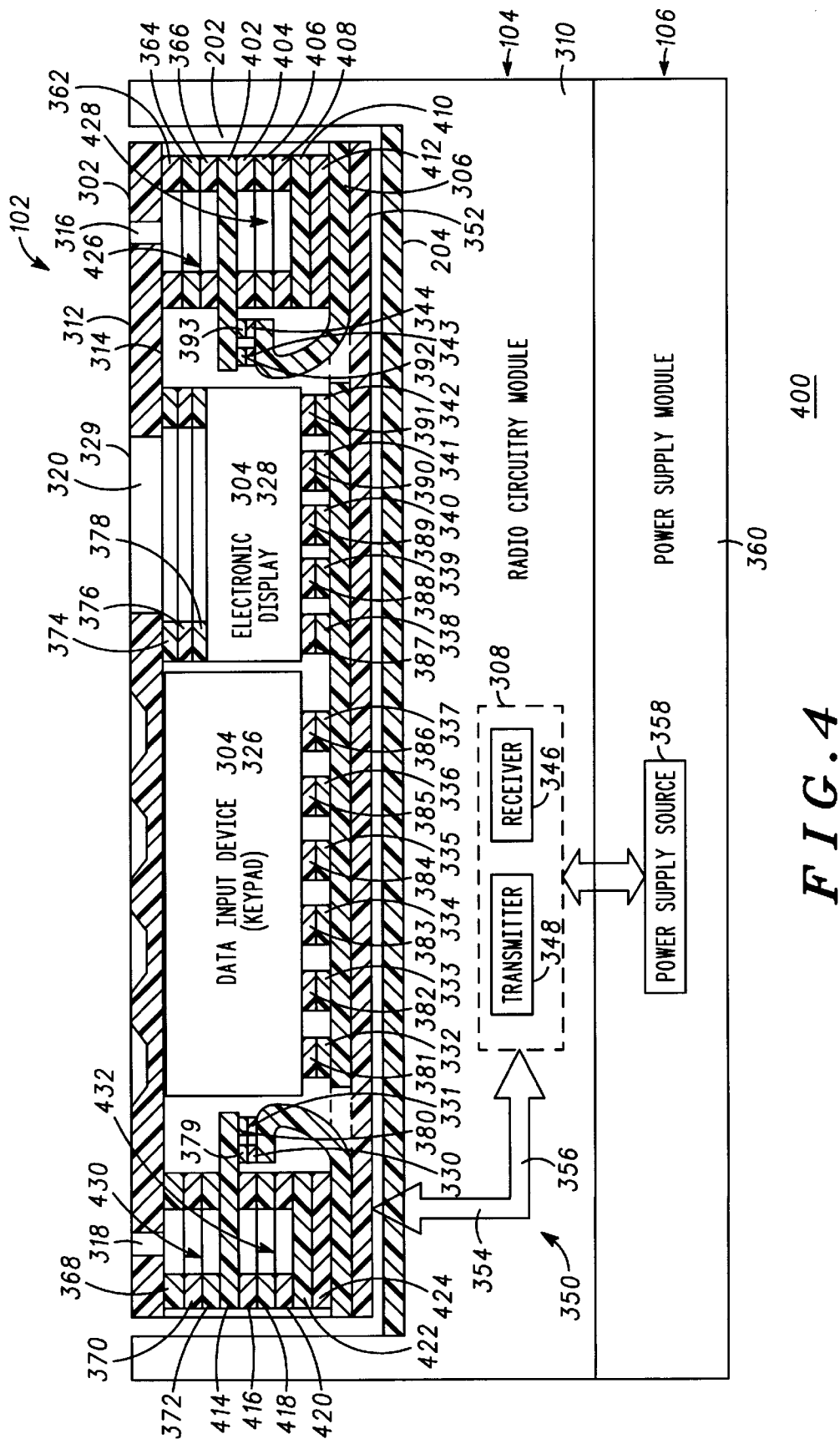
FIG. 4 is a cross sectional view of the radiotelephone of FIG. 1 taken along lines 3—3 in accordance with a second embodiment of the present invention.

FIG. 4 is a cross sectional view of the radiotelephone 100 of FIG. 1 taken along lines 3—3 in accordance with a second embodiment of the present invention. The user interface module further comprises a first earpiece adhesive layer 362, a first earpiece spacing layer 364, a second earpiece adhesive layer 366, an earpiece electroacoustic transducer sheet layer 402, a third earpiece adhesive layer 404, a second earpiece spacing layer 406, a fourth earpiece adhesive layer 408, an earpiece back sheet layer 410 and an earpiece gap filling layer 412. The user interface module 102 further comprises a first microphone adhesive layer 368, a first microphone spacing layer 370, a second microphone adhesive layer 372, a microphone electroacoustic transducer sheet layer 414, a third microphone adhesive layer 416, a second microphone spacing layer 418, a fourth microphone adhesive layer 420, an microphone back sheet layer 422 and a microphone gap filling layer 424.

The first earpiece adhesive layer 362 has an outer edge portion bonded to the bottom surface 314 of the membrane sheet layer 302 at a periphery of the earpiece acoustic aperture 316.

The first earpiece spacing layer 364 has a top surface disposed opposite a bottom surface. The top surface of the first earpiece spacing layer 364 is bonded by the first earpiece adhesive layer 362 to the bottom surface of the membrane sheet layer 302 at the periphery of the earpiece acoustic aperture 316.

The second earpiece adhesive layer 366 has an outer edge portion bonded to the bottom surface of the first earpiece spacing layer 364 at the periphery of the earpiece acoustic aperture 316.

The earpiece electroacoustic transducer sheet layer 402 partially forms the earpiece electroacoustic transducer 322 and has a top surface disposed opposite a bottom surface. The top surface of the earpiece electroacoustic transducer sheet layer 402 is bonded by the second earpiece adhesive layer 366 to the bottom surface of the first earpiece spacing layer 364 at the periphery of the earpiece acoustic aperture 316.

A first earpiece acoustic cavity 426 is formed between the bottom surface of the membrane sheet layer 302 and the top surface of the earpiece electroacoustic transducer sheet layer 402. The first earpiece acoustic cavity 426 having a depth determined by a thickness of the first earpiece adhesive layer 362, the first earpiece spacing layer 364, and the second earpiece adhesive layer 366.

The earpiece electroacoustic transducer sheet layer 402 having a first set of conductive contacts 392–393 electrically coupled to the pair of electrical earpiece conductors 343—

344 of the plurality of electrical conductors 330–344 of the flexible circuit sheet layer 306.

The third earpiece adhesive layer 404 has an outer edge portion bonded to the bottom surface of the earpiece electroacoustic transducer sheet layer 402 at the periphery of the earpiece acoustic aperture 316.

The second earpiece spacing layer 406 has a top surface disposed opposite a bottom surface. The top surface of the second earpiece spacing layer 406 is bonded by the third earpiece adhesive layer 404 to the bottom surface of the earpiece electroacoustic transducer sheet layer 402 at the periphery of the earpiece acoustic aperture 316.

The fourth earpiece adhesive layer 408 has an outer edge portion bonded to the bottom surface of the second earpiece spacing layer 406 at the periphery of the earpiece acoustic aperture 316.

The earpiece back sheet layer 410 has a top surface disposed opposite a bottom surface. The top surface of the earpiece back sheet layer 410 is bonded by the fourth earpiece adhesive layer 408 to the bottom surface of the second earpiece spacing layer 406 at the periphery of the earpiece acoustic aperture 316.

A second earpiece acoustic cavity 428 is formed between the bottom surface of the earpiece electroacoustic transducer sheet layer 402 and the top surface of the earpiece back sheet layer 410. The second earpiece acoustic cavity 428 has a depth determined by a thickness of the third earpiece adhesive layer 404, the second earpiece spacing layer 406, and the fourth earpiece adhesive layer 408.

The earpiece gap filling layer 412 is used to fill any left over gap between the earpiece back sheet layer 410 and the flexible circuit sheet layer 306.

Thus, it is important to note that a conventional "housing" of the earpiece electroacoustic transducer 322 is advantageously formed by integrating the earpiece electroacoustic transducer sheet layer 402 within the membrane structure of the user interface module 102 without including the extra size and weight of the conventional earpiece housing.

Now addressing the structure of the microphone, the first microphone adhesive layer 368 has an outer edge portion bonded to the bottom surface of the membrane sheet layer 302 at a periphery of the microphone acoustic aperture 316.

The first microphone spacing layer 370 has a top surface disposed opposite a bottom surface. The top surface of the first microphone spacing layer 370 is bonded by the first microphone adhesive layer 368 to the bottom surface of the membrane sheet layer 302 at the periphery of the microphone acoustic aperture 318.

The second microphone adhesive layer 372 has an outer edge portion bonded to the bottom surface of the first microphone spacing layer 370 at the periphery of the microphone acoustic aperture 318.

The microphone electroacoustic transducer sheet layer 414 partially forms the microphone electroacoustic transducer 324 and has a top surface disposed opposite a bottom surface. The top surface of the microphone electroacoustic transducer sheet layer 324 is bonded by the second microphone adhesive layer 372 to the bottom surface of the first microphone spacing layer 370 at the periphery of the microphone acoustic aperture 318.

A first microphone acoustic cavity 430 is formed between the bottom surface of the membrane sheet layer 302 and the top surface of the microphone electroacoustic transducer sheet layer 414. The first microphone acoustic cavity 430 has a depth determined by a thickness of the first microphone adhesive layer 368, the first microphone spacing layer 370, and the second microphone adhesive layer 372.

The microphone electroacoustic transducer sheet layer 414 has a first set of conductive contacts 379–380 electrically coupled to the pair of electrical microphone conductors 330–331 of the plurality of electrical conductors 330–344 of the flexible circuit sheet layer 306.

The third microphone adhesive layer 416 has an outer edge portion bonded to the bottom surface of the microphone electroacoustic transducer sheet layer 414 at the periphery of the microphone acoustic aperture 318.

The second microphone spacing layer 418 has a top surface disposed opposite a bottom surface. The top surface of the second microphone spacing layer 418 is bonded by the third microphone adhesive layer 416 to the bottom surface of the microphone electroacoustic transducer sheet layer 414 at the periphery of the microphone acoustic aperture 318.

The fourth microphone adhesive layer 420 has an outer edge portion bonded to the bottom surface of the second microphone spacing layer 418 at the periphery of the microphone acoustic aperture 318.

The microphone back sheet layer 422 has a top surface disposed opposite a bottom surface. The top surface of the microphone back sheet layer 422 is bonded by the fourth microphone adhesive layer 420 to the bottom surface of the second microphone spacing layer 418 at the periphery of the microphone acoustic aperture 318.

A second microphone acoustic cavity 432 is formed between the bottom surface of the microphone electroacoustic transducer sheet layer 414 and the top surface of the microphone back sheet layer 422. The second microphone acoustic cavity 432 has a depth determined by a thickness of the third microphone adhesive layer 416, the second microphone spacing layer 418, and the fourth microphone adhesive layer 420.

The microphone gap filling layer 424 is used to fill any left over gap between the microphone back sheet layer 422 and the flexible circuit sheet layer 306.

Thus, it is important to note that a conventional "housing" of the microphone electroacoustic transducer 324 is advantageously formed by integrating the microphone electroacoustic transducer sheet layer 414 within the membrane structure of the user interface module 102 without including the extra size and weight of the conventional microphone housing.

In the second embodiment, as shown in FIG. 4, the user interface circuitry 102 further comprises the data input device 326. The flexible circuit sheet layer 306 further includes the set of electrical data input 332–337 electrically coupled to the data input device 326. The radio circuitry 308 further includes the transmitter 348 electrically coupled to the data input device 326 via the set of electrical data input conductors 381–386.

Further, in the second embodiment, as shown in FIG. 4, the membrane sheet layer 302 further includes the display aperture 320 extending through the membrane sheet layer 320 between the top surface and the bottom surface. The user interface circuitry 102 further includes the electronic display 328 mechanically coupled to the membrane sheet layer 302 and disposed on the bottom surface 314 of the membrane sheet layer 302 opposite the display aperture 320. The flexible circuit sheet layer 306 further includes the set of electrical display conductors 338–342 electrically coupled to the electronic display 328. The radio circuitry 308 further includes at least one of the receiver 346 electrically coupled to the electronic display 328 via the set of electrical display conductors 387–391, and the transmitter 348 electrically coupled to the electronic display 328 via the set of electrical display conductors 387–391.

Figure 5:
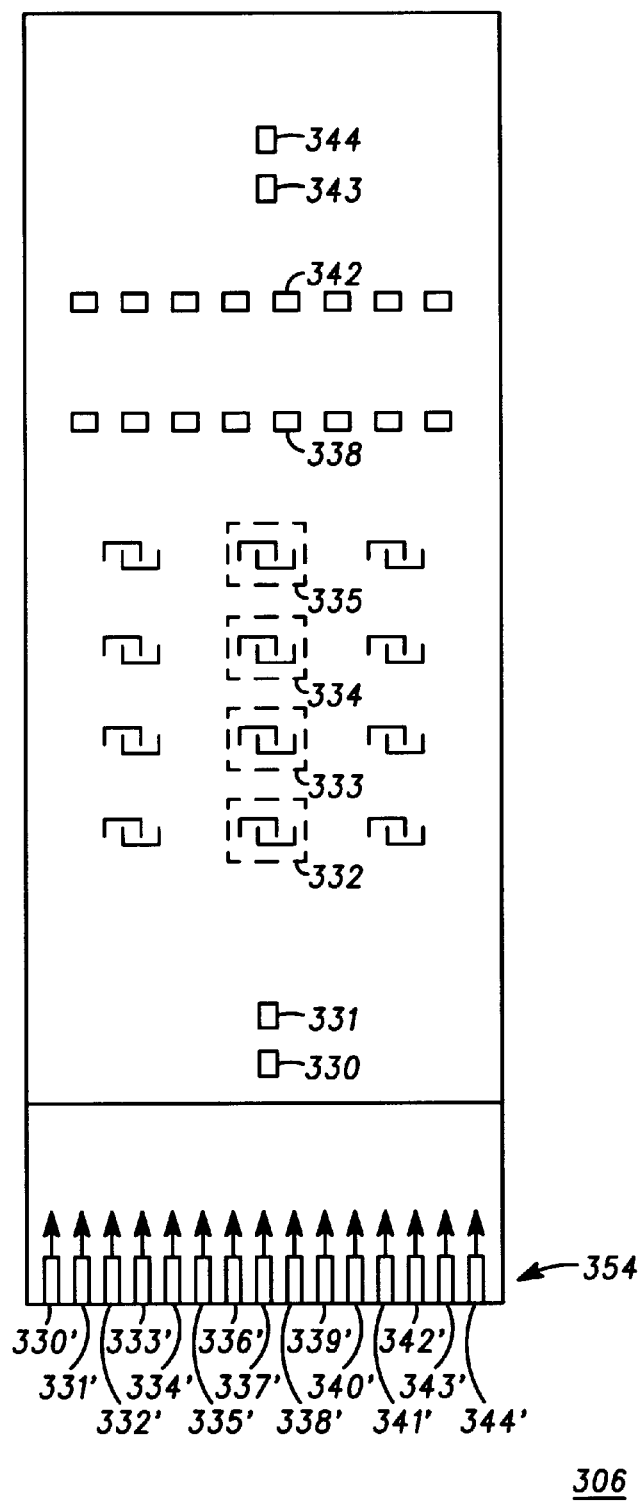
FIG. 5 is a top side plan view of a flexible circuit sheet layer of a user interface module of the radiotelephone of FIG. 1.

FIG. 5 is a top side plan view of the flexible circuit sheet layer 306 of a user interface module 102 of the radiotelephone 100 of FIG. 1. The flexible circuit sheet layer 306 includes the plurality of conductive contacts 330–344. As noted above, the number of contacts shown is representative of the connections but the actual number of connections will vary depending upon the particular application. Each of the conductive contacts 330–344 are routed across the flexible circuit sheet layer 306 in a conventional fashion (shown by representation only with short arrow at the ends of conductive contacts 330'–344') to connect to their respective conductive contacts 330'–344' at the first connector portion 354. The first connector portion 354 is shown here, by example, as a flexible circuit tail having the conductive contacts 330'–344' aligned thereon for coupling the second connector portion 356.

Figure 6:
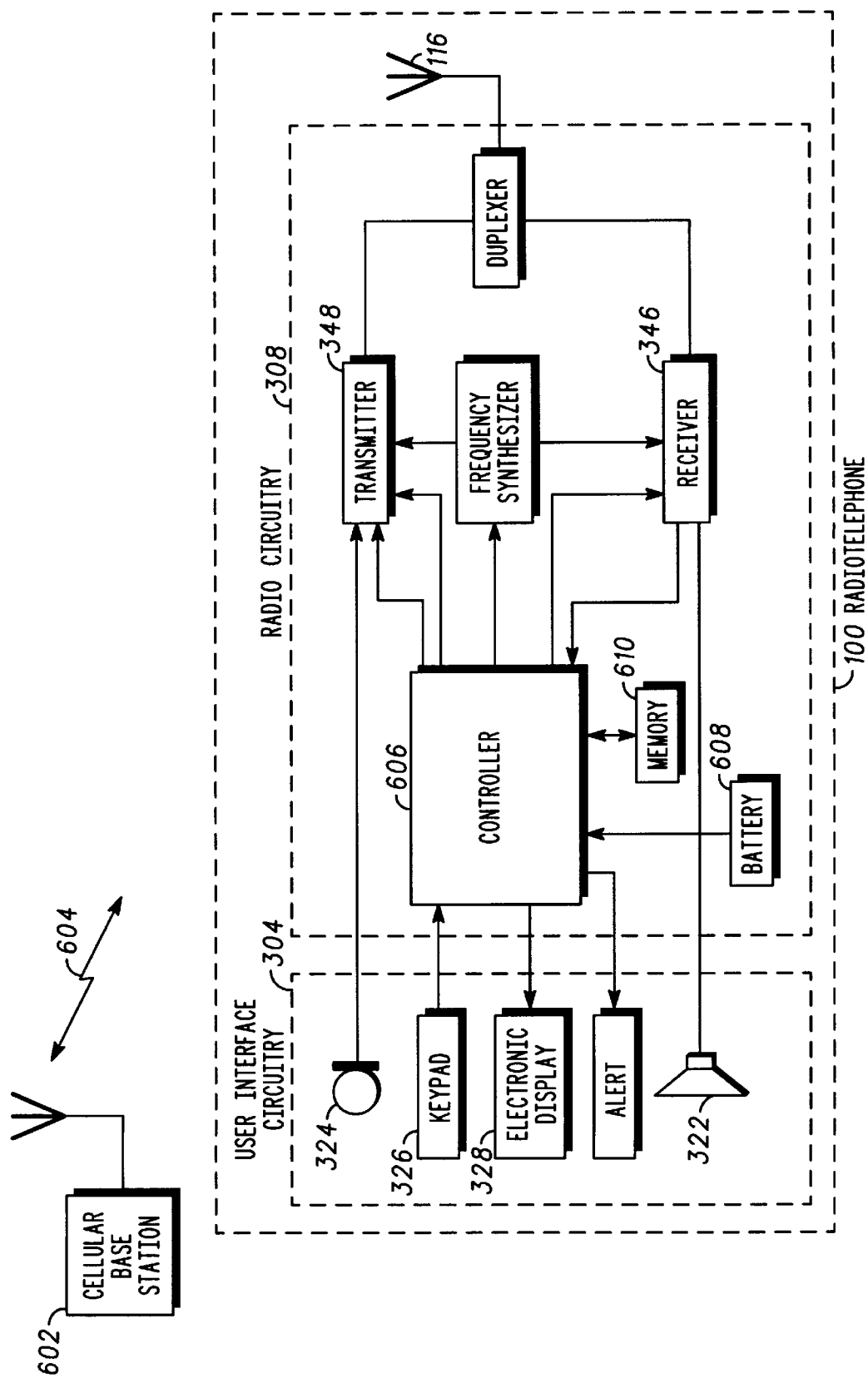
FIG. 6 is a block diagram of a radio frequency communications system employing the radiotelephone of FIG. 1.

FIG. 6 is a block diagram of a radio frequency communications system 600 employing the radiotelephone 100 of FIG. 1, wherein a cellular base station 602 and the radiotelephone 100 communicate via radio frequency (RF) signals 604. The radiotelephone 100 includes the antenna 116, the receiver 346, the transmitter 348, a controller 606, and the user interface circuitry 304 (also shown in FIGS. 3 and 4) that includes the earpiece electroacoustic transducer 322, the display 328, a microphone electroacoustic transducer 324, and the keypad 326. The controller 306 could be, for example, a 68HC11 microprocessor available from Motorola, Inc. The integrated circuits of radiotelephone 100 can be attached to light weight circuit boards of the type shown and described in U.S. Pat. No. 5,301,420 (incorporated herein in it's entirety by reference) by means of direct chip attach or ball grid array technologies to reduce the circuit board thickness. The radiotelephone 100 is powered by a detachable battery 608.

The radiotelephone 100 also includes a memory 610. The program to operate the radiotelephone 100 is stored in the memory 610. The memory 610 is preferably a read-only memory (ROM), but could be an erasable programmable read-only memory (EPROM), a random-access memory (RAM), or other suitable memory. Although the memory 312 is shown separate from the controller 606, it will be recognized that the memory 610 could be internal to the controller 606 and/or that the controller 606 may contain other memory in addition to memory 610.

The antenna 116 transduces the RF signals 604 into electrical RF receive signals and couples the electrical RF receive signals to the receiver 346. The receiver 346 transforms the electrical RF receive signals into data receive signals that are then coupled through the controller 606 and output to the user as audible speech via the speaker 322 and as operational information via the display 328. Speech and data input by the user via the microphone 324 and the keypad 326, respectively, are coupled to the transmitter 348 as data transmit signals. The transmitter 348 converts the data transmit signals into electrical RF transmit signals which are transduced by the antenna 116 and transmitted as the RF signals 604.

Originating/answering and terminating telephone calls with the radiotelephone 100 may be accomplished either by opening and closing top membrane portion (see FIGS. 7–10), or opening and closing, respectively, bottom membrane portion. Controller 606 detects the opening and closing of top membrane portion and bottom membrane portion and originates/answers a call being made/received or terminates a call in progress. Controller 606 may be implemented as shown and described in the instant assignee's U.S. Pat. No. 4,845,772 incorporated herein in it's entirety by reference thereto.

Figure 7:
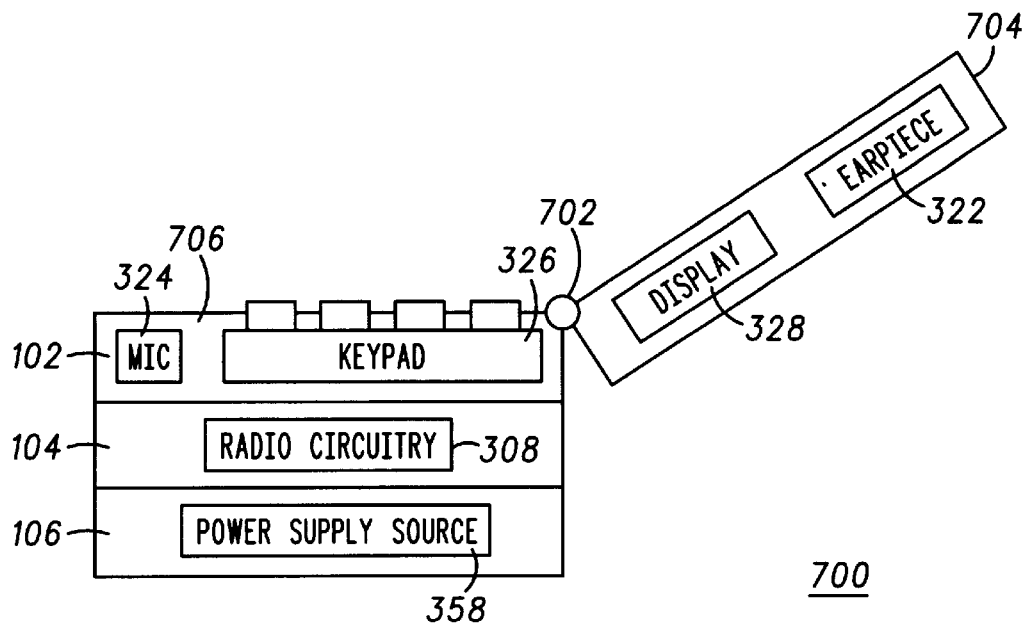
FIGS. 7 and 8 are side views of a second embodiment of a radiotelephone shown in an open position and a closed position, respectively, and embodying the present invention; the radiotelephone having one hinge mechanism.
Figure 8:
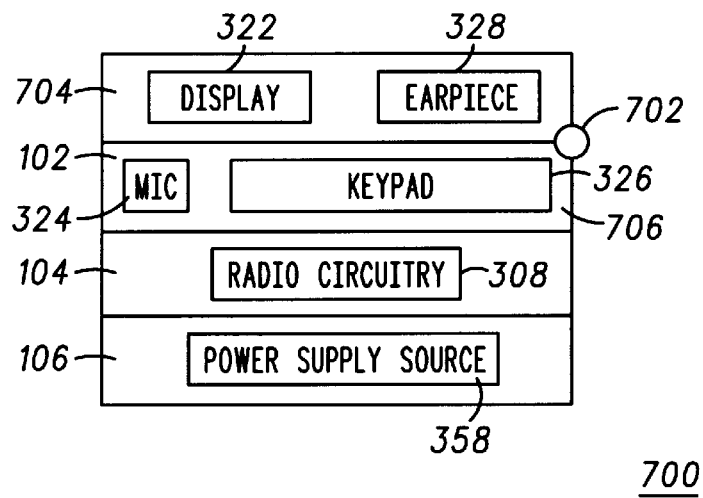

FIGS. 7 and 8 are side views of a second embodiment of a radiotelephone 700 shown in an open position and a closed position, respectively, and embodying the present invention. The radiotelephone 700 has a hinge mechanism 702. The hinge mechanism 702 rotatably couples a first user interface portion 704 relative to the second user interface portion 706. The first user interface portion 704 includes at least one of the earpiece electroacoustic transducer 322, the electronic display 328, the data input circuit 326 and the microphone electroacoustic transducer 324. The second user interface portion 706 includes at least one of the earpiece electroacoustic transducer 322, the electronic display 328, the data input circuit 326 and the microphone electroacoustic transducer 324 when they are not included in the first user interface portion 704. By example, in FIGS. 7 and 8, the earpiece electroacoustic transducer 322 and the electronic display 328 are disposed in the first user interface portion 704. Further, the microphone electroacoustic transducer 324 and the data input circuit 326 are disposed in the second user interface portion 706.

The hinge mechanism 702 is either a conventional spring or pin disposed in the membrane user interface module 102 with a latch on the first user interface portion 704 to retain it in a closed position or a conventional living hinge integrated into the user interface portion 704 as is well known in the art. Detent mechanism, as are well known, cause the first user interface portion 704 to open and close between two distinct positions relative to the second user interface portion 706.

Figure 9:
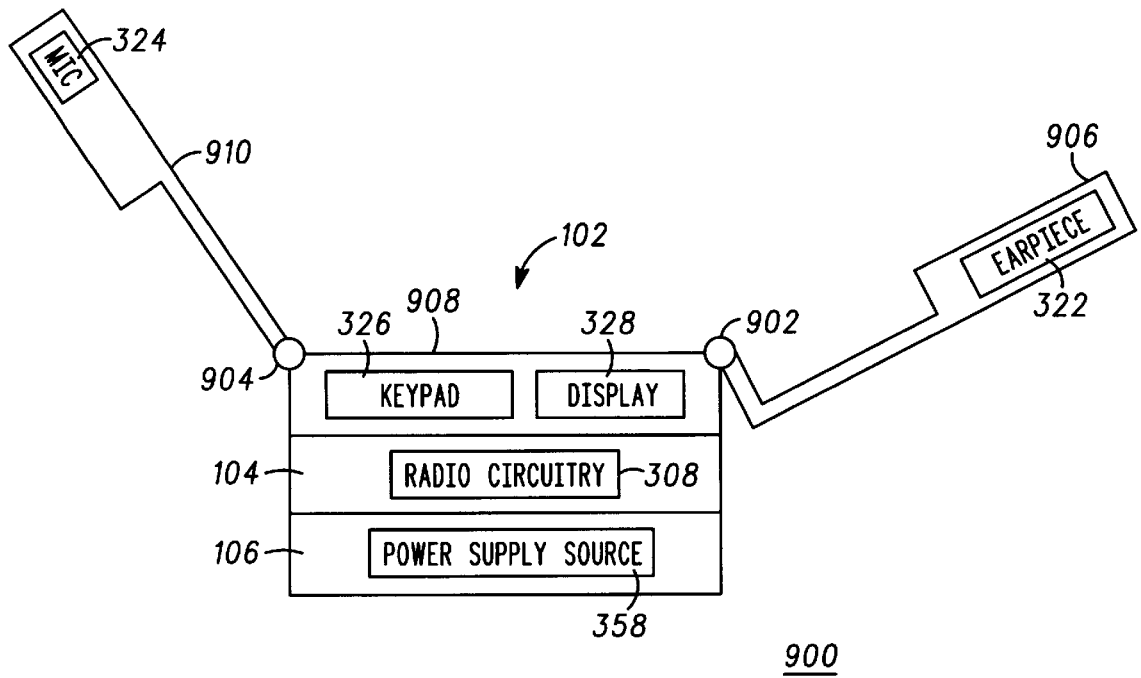
FIGS. 9 and 10 are side views of a third embodiment of a radiotelephone shown in an open position and a closed position, respectively, and embodying the present invention; the radiotelephone having two hinge mechanisms.
Figure 10:
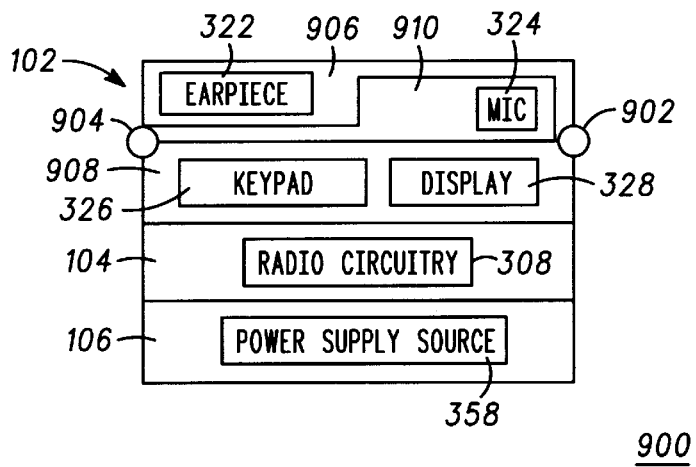

FIGS. 9 and 10 are side views of a third embodiment of a radiotelephone 900 shown in an open position and a closed position, respectively, and embodying the present invention. The radiotelephone 900 has two hinge mechanisms 902 and 904. The first hinge mechanism 902 rotatably couples a first user interface portion 906 relative to the second user interface portion 908. The first user interface portion 906 includes at least one of the earpiece electroacoustic transducer 322, the electronic display 328, the data input circuit 326 and the microphone electroacoustic transducer 324. The second hinge mechanism 904 rotatably couples a third user interface portion 910 relative to the second user interface portion 908. The second user interface portion 908 includes at least one of the earpiece electroacoustic transducer 322, the electronic display 328, the data input circuit 326 and the microphone electroacoustic transducer 324 when they are not included in the first user interface portion 906. The second hinge mechanism 904 rotatably couples a third user interface portion 910 relative to the second user interface portion 908. The third user interface portion 910 includes at least one of the earpiece electroacoustic transducer 322, the electronic display 328, the data input circuit 326 and the microphone electroacoustic transducer 324 when they are not included in the first user interface portion 906 or the second user interface portion 910. By example, in FIGS. 9 and 10, the earpiece electroacoustic transducer 322 is disposed in the first user interface portion 906, the electronic display 328 and the data input circuit 326 are disposed in the second user interface portion 908 and the microphone electroacoustic transducer 324 is disposed in the third user interface portion 910.

Note the cut outs in the first user interface portion 906 and the second user interface portion 910 advantageously accommodate the microphone transducer 324 and the earpiece transducer 322, respectively, when moved to their closed positions. The discussion above for FIGS. 7 and 8 regarding the hinge mechanisms and detent mechanisms also apply to FIGS. 9 and 10.

The radiotelephone embodiments shown in FIGS. 7–10 advantageously provide for a small radiotelephone when collapsed to achieve the size of a credit card or smaller.

In summary, the radiotelephone 100 comprises a user interface module including a membrane sheet layer, user interface circuitry and a flexible circuit sheet layer, and a radio circuitry module including radio circuitry and a radio housing. The user interface circuitry includes an earpiece electroacoustic transducer, microphone electroacoustic transducer, a keypad and a display being disposed between the membrane sheet layer and the flexible circuit sheet layer. The radio circuitry is electrically coupled to the user interface circuitry via electrical conductors on the flexible circuit sheet layer permitting many marketing options for the user interface module and efficient manufacturing of the radiotelephone. The radio housing encloses the radio circuitry and mechanically couples to the user interface module. The user interface module integrates the earpiece electroacoustic transducer and the microphone electroacoustic transducer as electroacoustic transducer sheet layers in the user interface module, and includes hinge mechanisms to produce a credit card sized radiotelephone.

The present invention advantageously provides reduced weight, reduced thickness, reduced complexity, reduced cost, flexible market differentiation options, reduced design cycle time and increased manufacturing efficiency. In combination, the features presented herein advantageously permit a closed radiotelephone to approach the size and shape of a credit card or driver's license when one hinge mechanism is used and to be even smaller when two hinge mechanisms are used. By integrating the earpiece electroacoustic transducer sheet layer 402 and microphone electroacoustic transducer sheet layer 414 with conventional membrane keypad technology and an integrated lens 329 for the electronic display 328 to produce a very thin user interface module 102. Further, with the ongoing miniaturization of conventional earpiece electroacoustic transducers and conventional microphone electroacoustic transducers, these piece parts can also be incorporated with conventional membrane keypad technology and an integrated lens 329 for the electronic display 328 to produce a relatively thin and robust user interface module 102.

While the present invention has been described with reference to illustrative embodiments thereof, it is not intended that the invention be limited to these specific embodiments. Those skilled in the art will recognize that variations and modifications can be made without departing from the spirit and scope of the invention as set forth in the appended claims.

What is claimed is:

1. A radiotelephone, comprising:
    a user interface module including:
        a membrane sheet layer having a top surface disposed opposite a bottom surface, the top surface being accessible to a user of the radiotelephone, the membrane sheet layer having at least one acoustic aperture extending through the membrane sheet layer between the top surface and the bottom surface,
        user interface circuitry including at least one electroacoustic transducer, the at least one electroacoustic transducer being mechanically coupled to the membrane sheet layer and disposed on the bottom surface of the membrane sheet layer opposite the at least one acoustic aperture, and
        a flexible circuit sheet layer having a plurality of electrical conductors electrically coupled to the user interface circuitry and disposed on the bottom surface of the membrane sheet layer,
    a radio circuitry module including:
        radio circuitry electrically coupled to the user interface circuitry via the electrical conductors of the flexible circuit sheet layer, and
        a radio housing having the radio circuitry and adapted to be mechanically coupled to the user interface module.

2. A radiotelephone according to claim 1 wherein the user interface module further comprises:
    a first adhesive layer having an outer edge portion bonded to the bottom surface of the membrane sheet layer at a periphery of the at least one acoustic aperture,
    a first spacing layer having a top surface disposed opposite a bottom surface, the top surface of the first spacing layer being bonded by the first adhesive layer to the bottom surface of the membrane sheet layer at the periphery of the at least one acoustic aperture,
    a second adhesive layer having an outer edge portion bonded to the bottom surface of the first spacing layer at the periphery of the at least one acoustic aperture,
    an electroacoustic transducer sheet layer forming the at least one electroacoustic transducer and having a top surface disposed opposite a bottom surface, the top surface of the electroacoustic transducer sheet layer being bonded by the second adhesive layer to the bottom surface of the first spacing layer at the periphery of the at least one acoustic aperture, a first acoustic cavity being formed between the bottom surface of the membrane sheet layer and the top surface of the electroacoustic transducer sheet layer, the first acoustic cavity having a depth determined by a thickness of the first adhesive layer, the first spacing layer, and the second adhesive layer, the electroacoustic transducer sheet layer having a first set of conductive contacts electrically coupled to a first set of electrical conductors of the plurality of electrical conductors of the flexible circuit sheet layer,
    a third adhesive layer having an outer edge portion bonded to the bottom surface of the electroacoustic transducer sheet layer at the periphery of the at least one acoustic aperture,
    a second spacing layer having a top surface disposed opposite a bottom surface, the top surface of the second spacing layer being bonded by the third adhesive layer to the bottom surface of the electroacoustic transducer sheet layer at the periphery of the at least one acoustic aperture,
    a fourth adhesive layer having an outer edge portion bonded to the bottom surface of the second spacing layer at the periphery of the at least one acoustic aperture, and
    a back sheet layer having a top surface disposed opposite a bottom surface, the top surface of the back sheet layer being bonded by the fourth adhesive layer to the bottom surface of the second spacing layer at the periphery of the at least one acoustic aperture, a second acoustic cavity being formed between the bottom surface of the electroacoustic transducer sheet layer and the top surface of the back sheet layer, the second acoustic cavity having a depth determined by a thickness of the third adhesive layer, the second spacing layer, and the fourth adhesive layer.

3. A radiotelephone according to claim 2 wherein the electroacoustic transducer sheet layer comprises one of:
an earpiece electroacoustic transducer sheet layer, and
a microphone electroacoustic transducer sheet layer.

4. A radiotelephone according to claim 2 wherein the user interface module further includes:
a first hinge mechanism for rotatably coupling a first user interface portion relative to the second user interface portion,
wherein the first user interface portion includes a first electroacoustic sheet layer forming the at least one electroacoustic transducer, and
wherein the second user interface portion includes a second electroacoustic sheet layer forming the at least one electroacoustic transducer when the user interface circuitry includes the second electroacoustic sheet layer.

5. A radiotelephone according to claim 4 wherein the user interface module further includes:
a second hinge mechanism for rotatably coupling a third user interface portion relative to the second user interface portion,
wherein the third user interface portion, instead of the second user interface portion, includes the second electroacoustic sheet layer forming the at least one electroacoustic transducer when the user interface circuitry includes the second electroacoustic sheet layer.

6. A radiotelephone according to claim 1:
wherein the at least one electroacoustic transducer comprises at least one of:
an earpiece electroacoustic transducer, and
a microphone electroacoustic transducer,
wherein the flexible circuit sheet layer further includes at least one of:
a pair of electrical earpiece conductors electrically coupled to the earpiece electroacoustic transducer, and
a pair of electrical microphone conductors electrically coupled to the microphone electroacoustic transducer,
wherein the radio circuitry further includes at least one of:
a receiver electrically coupled to the earpiece electroacoustic transducer via the pair of electrical earpiece conductors, and
a transmitter electrically coupled to the microphone electroacoustic transducer via the pair of electrical microphone conductors.

7. A radiotelephone according to claim 1:
wherein the user interface circuitry further comprises:
a data input circuit,
wherein the flexible circuit sheet layer further includes:
a set of electrical data input conductors electrically coupled to the data input circuit, and
wherein the radio circuitry further includes:
a transmitter electrically coupled to the data input circuit via the set of electrical data input conductors.

8. A radiotelephone according to claim 1:
wherein the membrane sheet layer further includes:
a display aperture extending through the membrane sheet layer between the top surface and the bottom surface,
wherein the user interface circuitry further includes:
an electronic display mechanically coupled to the membrane sheet layer and disposed on the bottom surface of the membrane sheet layer opposite the display aperture,
wherein the flexible circuit sheet layer further includes:
a set of electrical display conductors electrically coupled to the electronic display,
wherein the radio circuitry further includes at least one of:
a receiver electrically coupled to the electronic display via the set of electrical display conductors, and
a transmitter electrically coupled to the electronic display via the set of electrical display conductors.

9. A radiotelephone according to claim 1:
wherein the user interface module further includes:
a first connector electrically coupled to the plurality of electrical conductors, and
wherein the radio circuitry module further includes:
a second connector adapted to be connected to the first connector to electrically couple the radio circuitry to the user interface circuitry.

10. A radiotelephone according to claim 1 further comprising:
a power supply module including:
a power supply source electrically coupled to the radio circuitry; and
a power supply housing having the power supply source and adapted to be mechanically coupled to the radio housing.

11. A radiotelephone according to claim 1 wherein the user interface module further includes:
a first hinge mechanism for rotatably coupling a first user interface portion relative to the second user interface portion,
wherein the first user interface portion includes a first electroacoustic transducer of the at least one electroacoustic transducer, and
wherein the second user interface portion includes a second electroacoustic transducer of the at least one electroacoustic transducer when the user interface circuitry includes the second electroacoustic transducer.

12. A radiotelephone according to claim 11 wherein the user interface module further includes:
a second hinge mechanism for rotatably coupling a third user interface portion relative to the second user interface portion,
wherein the third user interface portion, instead of the second user interface portion, includes the second electroacoustic transducer of the at least one electroacoustic transducer when the user interface circuitry includes the second electroacoustic transducer.

13. A radiotelephone, comprising:
a user interface module including:
a membrane sheet layer having a top surface disposed opposite a bottom surface, the top surface being accessible to a user of the radiotelephone, the membrane sheet layer having earpiece acoustic aperture, and a microphone acoustic aperture, each aperture extending through the membrane sheet layer between the top surface and the bottom surface,
user interface circuitry including an earpiece electroacoustic transducer and a microphone electroacoustic transducer, the earpiece electroacoustic transducer being mechanically coupled to the membrane sheet layer and disposed on the bottom surface of the membrane sheet layer opposite the earpiece acoustic aperture, the microphone electroacoustic transducer being mechanically coupled to the membrane sheet layer and disposed on the bottom surface of the membrane sheet layer opposite the microphone acoustic aperture, a flexible circuit sheet layer having a plurality of electrical conductors electrically coupled to the user interface circuitry and disposed on the bottom surface of the membrane sheet layer, the plurality of electrical conductors further including:

a pair of electrical earpiece conductors electrically coupled to the earpiece electroacoustic transducer, and a pair of electrical microphone conductors electrically coupled to the microphone electroacoustic transducer, a radio circuitry module including:

radio circuitry electrically coupled to the user interface circuitry via the electrical conductors of the flexible circuit sheet layer, the radio circuitry further including:

a receiver electrically coupled to the earpiece electroacoustic transducer via the pair of electrical earpiece conductors, and a transmitter electrically coupled to the microphone electroacoustic transducer via the pair of electrical microphone conductors, and a radio housing having the radio circuitry and adapted to be mechanically coupled to the user interface module.

14. A radiotelephone according to claim 13 wherein the user interface module further comprises:

a first earpiece adhesive layer having an outer edge portion bonded to the bottom surface of the membrane sheet layer at a periphery of the earpiece acoustic aperture, a first earpiece spacing layer having a top surface disposed opposite a bottom surface, the top surface of the first earpiece spacing layer being bonded by the first earpiece adhesive layer to the bottom surface of the membrane sheet layer at the periphery of the earpiece acoustic aperture, a second earpiece adhesive layer having an outer edge portion bonded to the bottom surface of the first earpiece spacing layer at the periphery of the earpiece acoustic aperture, an earpiece electroacoustic transducer sheet layer forming the earpiece electroacoustic transducer and having a top surface disposed opposite a bottom surface, the top surface of the earpiece electroacoustic transducer sheet layer being bonded by the second earpiece adhesive layer to the bottom surface of the first earpiece spacing layer at the periphery of the earpiece acoustic aperture, a first earpiece acoustic cavity being formed between the bottom surface of the membrane sheet layer and the top surface of the earpiece electroacoustic transducer sheet layer, the first earpiece acoustic cavity having a depth determined by a thickness of the first earpiece adhesive layer, the first earpiece spacing layer, and the second earpiece adhesive layer, the earpiece electroacoustic transducer sheet layer having a first set of conductive contacts electrically coupled to the pair of electrical earpiece conductors of the plurality of electrical conductors of the flexible circuit sheet layer, a third earpiece adhesive layer having an outer edge portion bonded to the bottom surface of the earpiece electroacoustic transducer sheet layer at the periphery of the earpiece acoustic aperture, a second earpiece spacing layer having a top surface disposed opposite a bottom surface, the top surface of the second earpiece spacing layer being bonded by the third earpiece adhesive layer to the bottom surface of the earpiece electroacoustic transducer sheet layer at the periphery of the earpiece acoustic aperture, a fourth earpiece adhesive layer having an outer edge portion bonded to the bottom surface of the second earpiece spacing layer at the periphery of the earpiece acoustic aperture, an earpiece back sheet layer having a top surface disposed opposite a bottom surface, the top surface of the earpiece back sheet layer being bonded by the fourth earpiece adhesive layer to the bottom surface of the second earpiece spacing layer at the periphery of the earpiece acoustic aperture, a second earpiece acoustic cavity being formed between the bottom surface of the earpiece electroacoustic transducer sheet layer and the top surface of the earpiece back sheet layer, the second earpiece acoustic cavity having a depth determined by a thickness of the third earpiece adhesive layer, the second earpiece spacing layer, and the fourth earpiece adhesive layer, a first microphone adhesive layer having an outer edge portion bonded to the bottom surface of the membrane sheet layer at a periphery of the microphone acoustic aperture, a first microphone spacing layer having a top surface disposed opposite a bottom surface, the top surface of the first microphone spacing layer being bonded by the first microphone adhesive layer to the bottom surface of the membrane sheet layer at the periphery of the microphone acoustic aperture, a second microphone adhesive layer having an outer edge portion bonded to the bottom surface of the first microphone spacing layer at the periphery of the microphone acoustic aperture, a microphone electroacoustic transducer sheet layer forming the microphone electroacoustic transducer and having a top surface disposed opposite a bottom surface, the top surface of the microphone electroacoustic transducer sheet layer being bonded by the second microphone adhesive layer to the bottom surface of the first microphone spacing layer at the periphery of the microphone acoustic aperture, a first microphone acoustic cavity being formed between the bottom surface of the membrane sheet layer and the top surface of the microphone electroacoustic transducer sheet layer, the first microphone acoustic cavity having a depth determined by a thickness of the first microphone adhesive layer, the first microphone spacing layer, and the second microphone adhesive layer, the microphone electroacoustic transducer sheet layer having a first set of conductive contacts electrically coupled to the pair of electrical microphone conductors of the plurality of electrical conductors of the flexible circuit sheet layer, a third microphone adhesive layer having an outer edge portion bonded to the bottom surface of the microphone electroacoustic transducer sheet layer at the periphery of the microphone acoustic aperture, a second microphone spacing layer having a top surface disposed opposite a bottom surface, the top surface of the second microphone spacing layer being bonded by the third microphone adhesive layer to the bottom surface of the microphone electroacoustic transducer sheet layer at the periphery of the microphone acoustic aperture, a fourth microphone adhesive layer having an outer edge portion bonded to the bottom surface of the second microphone spacing layer at the periphery of the microphone acoustic aperture, and an microphone back sheet layer having a top surface disposed opposite a bottom surface, the top surface of the microphone back sheet layer being bonded by the fourth microphone adhesive layer to the bottom surface of the second microphone spacing layer at the periphery of the microphone acoustic aperture, a second microphone acoustic cavity being formed between the bottom surface of the microphone electroacoustic transducer sheet layer and the top surface of the microphone back sheet layer, the second microphone acoustic cavity having a depth determined by a thickness of the third microphone adhesive layer, the second microphone spacing layer, and the fourth microphone adhesive layer.

15. A radiotelephone according to claim 14 wherein the user interface module further includes:

a first hinge mechanism for rotatably coupling a first user interface portion relative to the second user interface portion, wherein the first user interface portion includes at least one of a first electroacoustic sheet layer forming the earpiece electroacoustic transducer and a second electroacoustic sheet layer forming the microphone electroacoustic transducer, and wherein the second user interface portion includes at least one of the first electroacoustic sheet layer forming the earpiece electroacoustic transducer and the second electroacoustic sheet layer forming the microphone electroacoustic transducer when not included in the first user interface portion.

16. A radiotelephone according to claim 15 wherein the user interface module further includes:

a second hinge mechanism for rotatably coupling a third user interface portion relative to the second user interface portion, wherein the third user interface portion includes at least one of the first electroacoustic sheet layer forming the earpiece electroacoustic transducer and the second electroacoustic sheet layer forming the microphone electroacoustic transducer when not included in the first user interface portion or the second user interface portion.

17. A radiotelephone according to claim 13:

wherein the user interface circuitry further comprises: a data input circuit, wherein the flexible circuit sheet layer further includes: a set of electrical data input conductors electrically coupled to the data input circuit, and wherein the radio circuitry further includes:
a transmitter electrically coupled to the data input circuit via the set of electrical data input conductors.

18. A radiotelephone according to claim 13:

wherein the membrane sheet layer further includes:
a display aperture extending through the membrane sheet layer between the top surface and the bottom surface, wherein the user interface circuitry further includes:
an electronic display mechanically coupled to the membrane sheet layer and disposed on the bottom surface of the membrane sheet layer opposite the display aperture, wherein the flexible circuit sheet layer further includes:
a set of electrical display conductors electrically coupled to the electronic display, wherein the radio circuitry further includes at least one of:
a receiver electrically coupled to the electronic display via the set of electrical display conductors, and
a transmitter electrically coupled to the electronic display via the set of electrical display conductors.

19. A radiotelephone according to claim 13:

wherein the user interface module further includes:
a first connector electrically coupled to the plurality of electrical conductors, and wherein the radio circuitry module further includes:
a second connector adapted to be connected to the first connector to electrically couple the radio circuitry to the user interface circuitry.

20. A radiotelephone according to claim 13 further comprising:

a power supply module including:
a power supply source electrically coupled to the radio circuitry; and
a power supply housing having the power supply source and adapted to be mechanically coupled to the radio housing.

21. A radiotelephone according to claim 13 wherein the user interface module further includes:

a first hinge mechanism for rotatably coupling a first user interface portion relative to the second user interface portion, wherein the first user interface portion includes at least one of the earpiece electroacoustic transducer and the microphone electroacoustic transducer, and wherein the second user interface portion includes at least one of the earpiece electroacoustic transducer and the microphone electroacoustic transducer when not included in the first user interface portion.

22. A radiotelephone according to claim 21 wherein the user interface module further includes:

a second hinge mechanism for rotatably coupling a third user interface portion relative to the second user interface portion, wherein the third user interface portion includes at least one of the earpiece electroacoustic transducer and the microphone electroacoustic transducer when not included in the first user interface portion or the second user interface portion.

23. A radiotelephone, comprising:

a user interface module including:
a membrane sheet layer having a top surface disposed opposite a bottom surface, the top surface being accessible to a user of the radiotelephone, the membrane sheet layer having earpiece acoustic aperture, a microphone acoustic aperture, and a display aperture, each aperture extending through the membrane sheet layer between the top surface and the bottom surface, user interface circuitry including an earpiece electroacoustic transducer, a microphone electroacoustic transducer, a data input circuit and an electronic display, the earpiece electroacoustic transducer being mechanically coupled to the membrane sheet layer and disposed on the bottom surface of the membrane sheet layer opposite the earpiece acoustic aperture, the microphone electroacoustic transducer being mechanically coupled to the membrane sheet layer and disposed on the bottom surface of the membrane sheet layer opposite the microphone acoustic aperture, the data input circuit being mechanically coupled to the membrane sheet layer and disposed on the bottom surface of the membrane sheet layer, and the electronic display being mechanically coupled to the membrane sheet layer and disposed on the bottom surface of the membrane sheet layer opposite the display aperture, a flexible circuit sheet layer having a plurality of electrical conductors electrically coupled to the user interface circuitry and disposed on the bottom surface of the membrane sheet layer, the plurality of electrical conductors further including:

a pair of electrical earpiece conductors electrically coupled to the earpiece electroacoustic transducer, a pair of electrical microphone conductors electrically coupled to the microphone electroacoustic transducer, a set of electrical data input conductors electrically coupled to the data input circuit, and a set of electrical display conductors electrically coupled to the electronic display, and a radio circuitry module including:

radio circuitry electrically coupled to the user interface circuitry via the electrical conductors of the flexible circuit sheet layer, the radio circuitry further including:

a receiver electrically coupled to the earpiece electroacoustic transducer via the pair of electrical earpiece conductors and electrically coupled to the electronic display via the set of electrical display conductors, and a transmitter electrically coupled to the microphone electroacoustic transducer via the pair of electrical microphone conductors, electrically coupled to the data input circuit via the set of electrical data input conductors, and electrically coupled to the electronic display via the set of electrical display conductors, and a radio housing having the radio circuitry and adapted to be mechanically coupled to the user interface module.

24. A radiotelephone according to claim 23 wherein the user interface module further comprises:

a first earpiece adhesive layer having an outer edge portion bonded to the bottom surface of the membrane sheet layer at a periphery of the earpiece acoustic aperture, a first earpiece spacing layer having a top surface disposed opposite a bottom surface, the top surface of the first earpiece spacing layer being bonded by the first earpiece adhesive layer to the bottom surface of the membrane sheet layer at the periphery of the earpiece acoustic aperture, a second earpiece adhesive layer having an outer edge portion bonded to the bottom surface of the first earpiece spacing layer at the periphery of the earpiece acoustic aperture, an earpiece electroacoustic transducer sheet layer forming the earpiece electroacoustic transducer and having a top surface disposed opposite a bottom surface, the top surface of the earpiece electroacoustic transducer sheet layer being bonded by the second earpiece adhesive layer to the bottom surface of the first earpiece spacing layer at the periphery of the earpiece acoustic aperture, a first earpiece acoustic cavity being formed between the bottom surface of the membrane sheet layer and the top surface of the earpiece electroacoustic transducer sheet layer, the first earpiece acoustic cavity having a depth determined by a thickness of the first earpiece adhesive layer, the first earpiece spacing layer, and the second earpiece adhesive layer, the earpiece electroacoustic transducer sheet layer having a first set of conductive contacts electrically coupled to the pair of electrical earpiece conductors of the plurality of electrical conductors of the flexible circuit sheet layer, a third earpiece adhesive layer having an outer edge portion bonded to the bottom surface of the earpiece electroacoustic transducer sheet layer at the periphery of the earpiece acoustic aperture, a second earpiece spacing layer having a top surface disposed opposite a bottom surface, the top surface of the second earpiece spacing layer being bonded by the third earpiece adhesive layer to the bottom surface of the earpiece electroacoustic transducer sheet layer at the periphery of the earpiece acoustic aperture, a fourth earpiece adhesive layer having an outer edge portion bonded to the bottom surface of the second earpiece spacing layer at the periphery of the earpiece acoustic aperture, an earpiece back sheet layer having a top surface disposed opposite a bottom surface, the top surface of the earpiece back sheet layer being bonded by the fourth earpiece adhesive layer to the bottom surface of the second earpiece spacing layer at the periphery of the earpiece acoustic aperture, a second earpiece acoustic cavity being formed between the bottom surface of the earpiece electroacoustic transducer sheet layer and the top surface of the earpiece back sheet layer, the second earpiece acoustic cavity having a depth determined by a thickness of the third earpiece adhesive layer, the second earpiece spacing layer, and the fourth earpiece adhesive layer, a first microphone adhesive layer having an outer edge portion bonded to the bottom surface of the membrane sheet layer at a periphery of the microphone acoustic aperture, a first microphone spacing layer having a top surface disposed opposite a bottom surface, the top surface of the first microphone spacing layer being bonded by the first microphone adhesive layer to the bottom surface of the membrane sheet layer at the periphery of the microphone acoustic aperture, a second microphone adhesive layer having an outer edge portion bonded to the bottom surface of the first microphone spacing layer at the periphery of the microphone acoustic aperture, a microphone electroacoustic transducer sheet layer forming the microphone electroacoustic transducer and having a top surface disposed opposite a bottom surface, the top surface of the microphone electroacoustic transducer sheet layer being bonded by the second microphone adhesive layer to the bottom surface of the first microphone spacing layer at the periphery of the microphone acoustic aperture, a first microphone acoustic cavity being formed between the bottom surface of the membrane sheet layer and the top surface of the microphone electroacoustic transducer sheet layer, the first microphone acoustic cavity having a depth determined by a thickness of the first microphone adhesive layer, the first microphone spacing layer, and the second microphone adhesive layer, the microphone electroacoustic transducer sheet layer having a first set of conductive contacts electrically coupled to the pair of electrical microphone conductors of the plurality of electrical conductors of the flexible circuit sheet layer, a third microphone adhesive layer having an outer edge portion bonded to the bottom surface of the microphone electroacoustic transducer sheet layer at the periphery of the microphone acoustic aperture, a second microphone spacing layer having a top surface disposed opposite a bottom surface, the top surface of the second microphone spacing layer being bonded by the third microphone adhesive layer to the bottom surface of the microphone electroacoustic transducer sheet layer at the periphery of the microphone acoustic aperture, a fourth microphone adhesive layer having an outer edge portion bonded to the bottom surface of the second microphone spacing layer at the periphery of the microphone acoustic aperture, and an microphone back sheet layer having a top surface disposed opposite a bottom surface, the top surface of the microphone back sheet layer being bonded by the fourth microphone adhesive layer to the bottom surface of the second microphone spacing layer at the periphery of the microphone acoustic aperture, a second microphone acoustic cavity being formed between the bottom surface of the microphone electroacoustic transducer sheet layer and the top surface of the microphone back sheet layer, the second microphone acoustic cavity having a depth determined by a thickness of the third microphone adhesive layer, the second microphone spacing layer, and the fourth microphone adhesive layer.

25. A radiotelephone according to claim 24 wherein the user interface module further includes:

a first hinge mechanism for rotatably coupling a first user interface portion relative to the second user interface portion, wherein the first user interface portion includes at least one of a first electroacoustic sheet layer forming the earpiece electroacoustic transducer, the electronic display, the data input circuit and a second electroacoustic sheet layer forming the microphone electroacoustic transducer, and wherein the second user interface portion includes at least one of the first electroacoustic sheet layer forming the earpiece electroacoustic transducer, the electronic display, the data input circuit and the second electroacoustic sheet layer forming the microphone electroacoustic transducer when not included in the first user interface portion.

26. A radiotelephone according to claim 25 wherein the user interface module further includes:

a second hinge mechanism for rotatably coupling a third user interface portion relative to the second user interface portion, wherein the third user interface portion includes at least one of the first electroacoustic sheet layer forming the earpiece electroacoustic transducer, the electronic display, the data input circuit and the second electroacoustic sheet layer forming the microphone electroacoustic transducer when not included in the first user interface portion or the second user interface portion.

27. A radiotelephone according to claim 23:

wherein the user interface module further includes:
a first connector electrically coupled to the plurality of electrical conductors, and wherein the radio circuitry module further includes:
a second connector adapted to be connected to the first connector to electrically couple the radio circuitry to the user interface circuitry.

28. A radiotelephone according to claim 23 further comprising:

a power supply module including:
a power supply source electrically coupled to the radio circuitry; and
a power supply housing having the power supply source and adapted to be mechanically coupled to the radio housing.

29. A radiotelephone according to claim 23 wherein the user interface module further includes:

a first hinge mechanism for rotatably coupling a first user interface portion relative to the second user interface portion, wherein the first user interface portion includes at least one of the earpiece electroacoustic transducer, the electronic display, the data input circuit and the microphone electroacoustic transducer, and wherein the second user interface portion includes at least one of the earpiece electroacoustic transducer, the electronic display, the data input circuit and the microphone electroacoustic transducer when not included in the first user interface portion.

30. A radiotelephone according to claim 29 wherein the user interface module further includes:

a second hinge mechanism for rotatably coupling a third user interface portion relative to the second user interface portion, wherein the third user interface portion includes at least one of the earpiece electroacoustic transducer, the electronic display, the data input circuit and the microphone electroacoustic transducer when not included in the first user interface portion or the second user interface portion.

* * * * *